United States Patent [19]

Petri

[11] Patent Number: 4,769,966
[45] Date of Patent: Sep. 13, 1988

[54] GROMMET STRIP

[76] Inventor: Hector D. Petri, 384 Edmunds Rd., Framingham, Mass. 01701

[21] Appl. No.: 40,501

[22] Filed: Apr. 20, 1987

Related U.S. Application Data

[63] Continuation of Ser. No. 850,201, Apr. 10, 1986, abandoned.

[51] Int. Cl.⁴ .............................................. E04C 2/38
[52] U.S. Cl. ...................................... 52/716; 49/462; 52/823
[58] Field of Search ................... 267/152, 158, 164; 108/27; 49/462; 52/716, 717, 718, 802, 803

[56] References Cited

U.S. PATENT DOCUMENTS

| | | | |
|---|---|---|---|
| 2,794,757 | 6/1957 | Bright | 52/823 X |
| 2,856,230 | 10/1958 | Adell | 49/462 |
| 2,954,310 | 9/1960 | Truesdell et al. | 161/100 |
| 3,208,159 | 9/1965 | Seckerson | 52/718.1 |
| 3,382,614 | 5/1968 | Adell | 49/462 |
| 3,706,173 | 12/1972 | Taylor | 49/462 X |
| 3,934,385 | 1/1976 | Paulus et al. | 52/717.1 |
| 3,977,048 | 8/1976 | Benedetti | 52/718.1 X |
| 4,188,424 | 2/1980 | Ohno et al. | 52/716 X |
| 4,242,848 | 1/1981 | Schoultz | 52/716 |
| 4,270,792 | 6/1981 | Mathieson et al. | 52/716 |
| 4,271,634 | 6/1981 | Andrzejewski | 52/716 |
| 4,310,164 | 1/1982 | Mesnel | 57/718.1 |
| 4,677,790 | 7/1987 | Adell | 49/462 |

FOREIGN PATENT DOCUMENTS

| | | | |
|---|---|---|---|
| 295151 | 11/1967 | Australia | 49/462 |
| 958285 | 5/1964 | United Kingdom | 52/717.1 |
| 1182244 | 2/1970 | United Kingdom | 52/716.1 |

Primary Examiner—George E. A. Halvosa
Attorney, Agent, or Firm—John E. Toupal; Harold G. Jarcho

[57] ABSTRACT

A grommet strip for mounting along an exposed edge of a wall and including a spring tempered metal substrate strip comprising an elongated base portion and a plurality of longitudinally spaced apart finger portions extending in a common direction from each longitudinal edge of the base portion and substantially normal thereto. The finger portions extending from one of the edges are longitudinally spaced from the finger portions extending from the other edge. Together, the base and finger portions form an elongated channel with an open end opposite to the base portion and adapted to receive the edge of the wall with an inner surface of the base portion engaging the exposed edges and inner surfaces of the finger portions engaging marginal sections of the wall directly adjacent thereto.

15 Claims, 2 Drawing Sheets

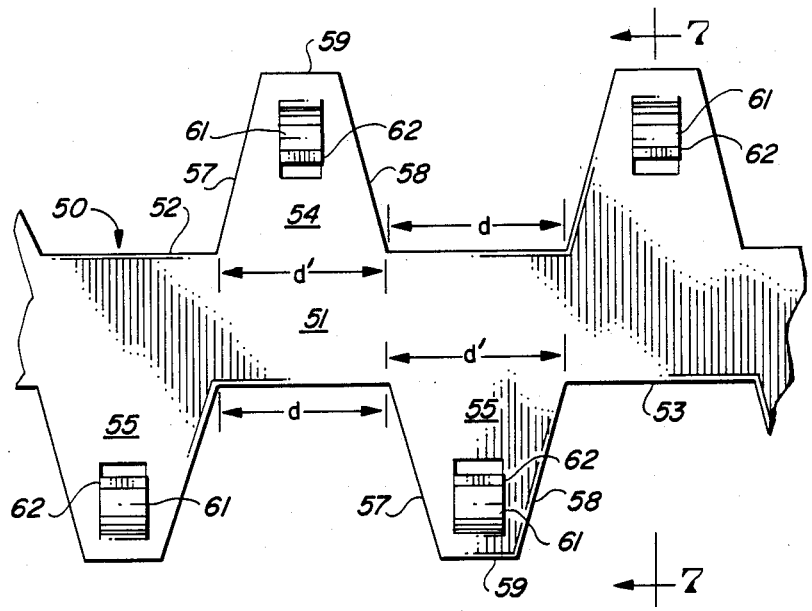
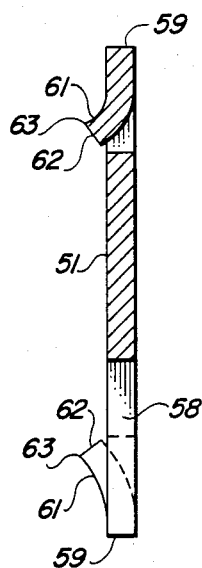
FIG. 6     FIG. 7
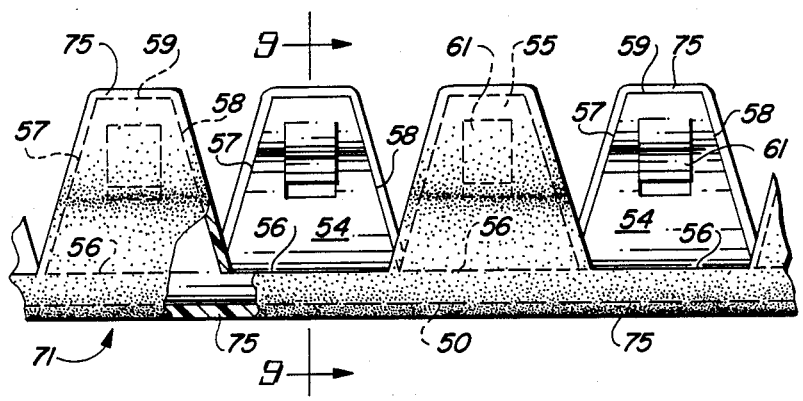
FIG. 8
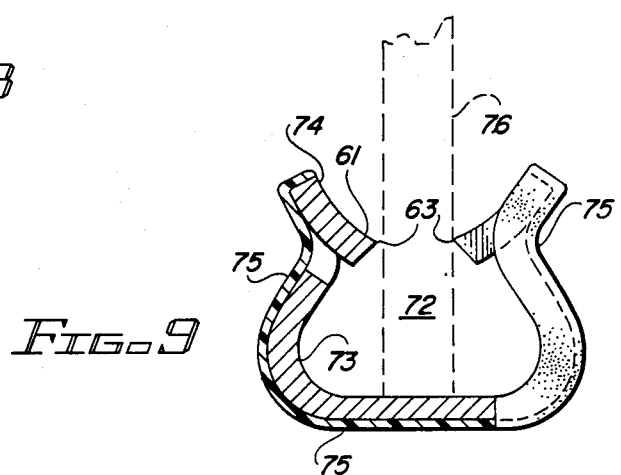
FIG. 9

GROMMET STRIP

CROSS-REFERENCE TO RELATED APPLICATION

This application is a continuation of U.S. patent application Ser. No. 06/850,201, "Grommet Strip" filed on April 10, 1986 now abandoned.

BACKGROUND OF THE INVENTION

This invention relates generally to a grommet strip for covering an exposed edge of a wall and, more particularly, to an electrically insulating grommet strip for covering the exposed edges of openings in electrical equipment housings.

Electrical equipment housings frequently possess openings for the passage of electrical wires. Generally, such openings are equipped with grommets or bushings that cover and insulate the exposed edges of the openings. A common grommet is made of rubber or a similar resilient material and consists of a pair of annular spaced apart flange portions internally joined by a cylindrical portion. The cylindrical portion projects through an opening and the flange portions engage the peripheral wall portions thereof. Disadvantages of such grommets include the requirement for large inventories to accommodate openings of various size, and their inapplicability to openings of other than circular shape.

The above problems are somewhat alleviated by a grommet strip having a flat, elongated base from opposite edge of which project longitudinally spaced apart pair of fingers. The strip can be cut to desired length and then applied to an opening with the base engaging the edge of the opening and the fingers engaging peripheral portions thereof. Such a grommet strip is disclosed in British Pat. No. 849,761. However: certain disadvantages persist for even the above described grommet strip. For example, the installation of the grommet strip into openings of complex shape requires the use of an adhesive and is, therefore, quite labor intensive, The object of this invention, therefore. is to provide an improved grommet for covering the exposed edges of openings in electrical housings,

SUMMARY OF THE INVENTION

The invention is a grommet strip for mounting along an exposed edge of a wall and including a spring tempered metal substrate strip comprising an elongated base portion and a plurality of spaced apart finger portions extending in a common direction from each longitudinal edge of the base portion and substantially normal thereto. Together, the inner surfaces of the base and finger portions form an elongated channel with an open end opposite to the base portion and adapted to receive the edge of the wall with an inner surface of the base portion engaging the exposed edge and inner surfaces of the finger portions engaging marginal sections of the wall directly adjacent thereto. Covering an outer surface portion of the base and finger portions while leaving the inner surfaces thereof exposed is a resilient, non-metalic coating that provides an elongated resilient surface along the exposed edge. The coated outer surfaces provide a resilient, protective covering where needed while the exposed inner surfaces provide maximum spacing for receiving the wall.

According to one feature of the invention, each of the finger portions comprise an inner end fixed to the base portion and an outer portion spaced therefrom, and each of the outer portions is bent inwardly into the channel. Inward bending of the outer finger portions reduces the spacing therebetween and thereby increases the spring force available to grip wall surface adjacent to an exposed edge.

According to other features of the invention, each of the finger portion comprises a first intermediate portion fixed to one of the longitudinal edges and bent therefrom into the channel and a second intermediate portion between the first intermediate portion and the outer portion, the second intermediate portion is bent away from the channel so as to form with the first intermediate portion a V-shaped section for the finger portions; the outer portion and the second intermediate portion of each finger portion are engaged, and the outer portions comprise outer edges disposed to engage the marginal sections of the wall. The V-shaped sections improve the spring characteristics of the finger portions and the outer edgs enhance the gripping capability thereof.

In a features embodiment, the invention is a grommet strip for mounting along an exposed edge of a wall and including a spring tempered metal substrate strip comprising an elongated base portion and a plurality of spaced apart finger portions forming strip voids and extending in a common direction from each longitudinal edge thereof and substantially normal thereto, the inner surfaces of the base and finger portions forming an elongated channel with an open end opposite to the base portion and adapted to receive the edge of the wall with the inner surface of the base portion engaging the exposed edge and the inner surfaces of the finger portions engaging marginal sections of the wall directly adjacent thereto. A resilient, non-metalic coating covers outer surface portions of the base portion so as to provide an elongated resilient surface along the exposed edge, but has limited bounds that establish coating voids coextensive with the strip voids and therewith provide transverse openings into the channel. Displacement of the finger portions enhances the operational flexibility of the grommet.

According to other features of the above embodiment the finger portions extending from each of the longitudinal edges are horizontally separated by spaces of substantial length and each of the finger portions extending from each longitudinal edge is transversely aligned with a space between a pair of the finger portions extending from the longitudinal edge. These features simplify fabrication of the grommet in a progressive die. According to yet other features of the embodiment, each finger portion includes a tab portion bent into the channel so as to provide therein an engagement edge shaped and arranged to engage the marginal portions of the wall. The engagement edges enhance the retention capability of the grommet without additional substrate material requirements.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENT

Figure 1:
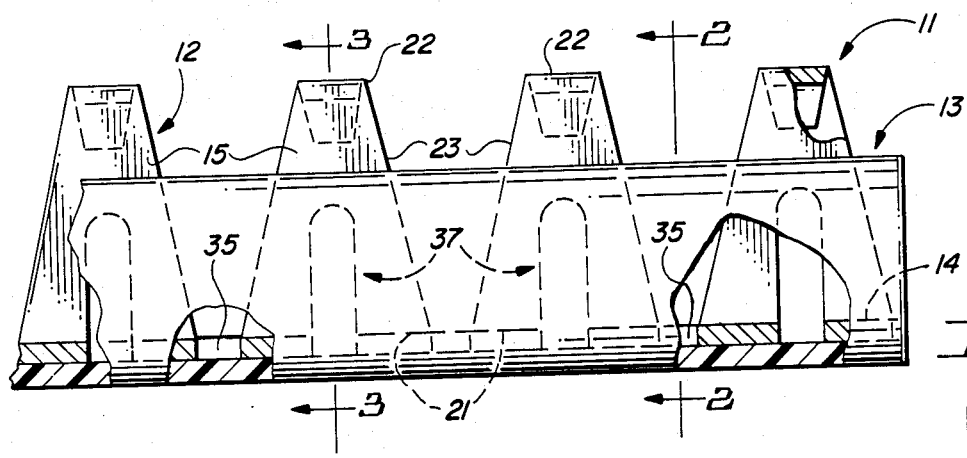
FIG. 1 is a schematic side elevational view of a portion of grommet strip according to the invention.

As illustrated in figs. 1—4, a grommet strip 11 according to the invention includes a spring tempered metal substrate strip 12 and a resilient, non-metalic coating 13, The substrate 12 includes an elongated, flat base portion 14 and a plurality of uniformly spaced apart finger portions 15 projecting thereform. As shown in FIGS., 2 and 3, the finger portions 15 extend in a common, substantially normal direction from the base portion 14 along both longtiudinal edges thereof. Preferably, the substrate strip 12 is a stamping formed from 0.012 thick type 301 ¼ hard stainless steel and the coating 13 is formed from rubber and fixed to the substrate 12 with a suitable adhesive.

Figure 2:
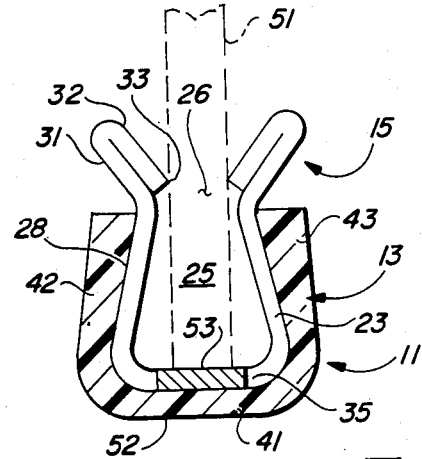
FIG. 2 is a schematic cross sectional view taken along lines 2—2 of FIG. 1.
Figure 4:
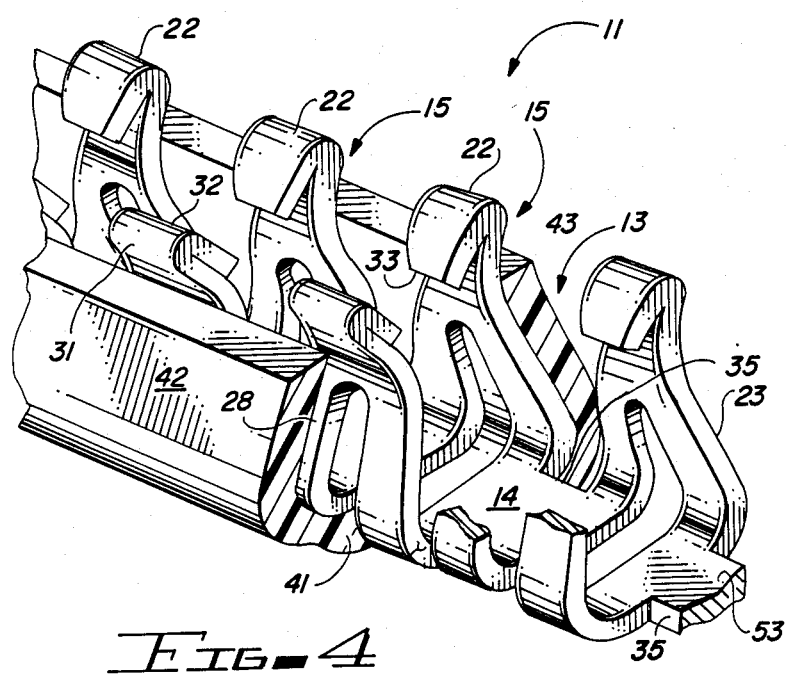
FIG. 4 is a partially cut away perspective view of the grommet strip shown in FIG. 1.
Figure 3:
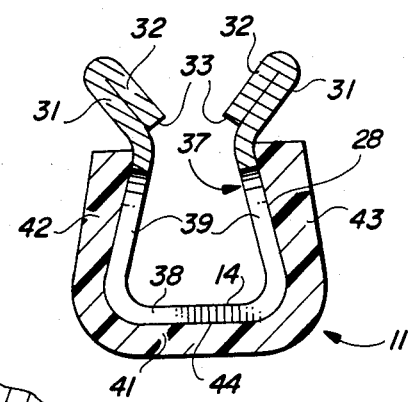
FIG. 3 is a schematic cross sectional view taken along lines 3—3 of FIG. 1.

Each of the finger portions 15 includes an inner end with a bottom edge 21 extending along a longitudinal edge of the base portion 14 and a substantially shorter top edge 22. Extending between the ends, respectively, of the bottom edges 21 and top edges 22 are side edges 23, From the bottom edge 21, the side edges 23 slope together toward the shorter top edge 22. As shown in FIGS. 2 and 3, the base portion 14 and the finger portions 15 projecting therefrom form an elongated channel 25 having an open end 26. Each of the finger portions 15 includes a first intermediate length 28 bent inwardly into the channel 25 from a longitudinal edge of the base portion 14. Joined to the intermediate lengths 28 are second intermediate lengths 31 bent outwardly therefrom and away from the channel 25 so as to form with first intermediate length 28 a V-shaped configuration for the side edges 23. An outer portion 32 of each finger portion 15 is bent inwardly into the cannel 25 and into engagement with an inner surface of a second intermediate length 31. Exposed inner edges 33 of the inwardly bent outer portions 32 define the minimum transverse dimension of the open end 26 of the elongated channel 25.

A plurality of notches 35 are formed along each longitudinal edge of the base portion 14. A notch 35 is disposed between each pair of adjacent finger portions 15 extending along each longitudinal edge of the base portion 14. The structural relief provided by the notches enhances the ability of the strip 11 to flex along arcs parallel to the longitudinal axis thereof. Also formed in the substrate strip 12 are a plurality of longitudinally spaced apart transverse slots 37. Each of the slots 37 includes a middle part 38 extending through the base portion 14 and end parts 39, each cut in a different first intermediate length 28 of a finger portion 15. The outer parts 39 of each transverse slot 37 lie in finger portions 15 spaced transversely apart between opposite longitudinal edges of the base portion 14.

As shown in FIGS. 2 and 3, the coating 13 is a U-shed channel having a bottom wall 41 and sidewalls 42, 43. The bottom wall 41 of the channel 13 covers an outer surface 44 of the base portion 14 so as to provide a resilient, protective coating therefor. Similarly, the side walls 42, 43, respectively, provide resilient, protective coatings for outer surfaces of the first intermediate lengths 28 of the finger portions 15. Preferably, the channel 13 is secured to the substrate strip 12 with a suitable adhesive, A preferred embodiment of the invention covers the exposed edges of wall panels having a thickness of between 0.047 and 0.09 inches. For that embodiment, the height of the finger portions 15 between the bottom edge 21 and top edge 22 is approximately 0.18 inches. The width of the bottom wall 41 is approximately 0.16 inches, the height of each of the side walls 42, 43 is approximately 0.13 inches and the spacing between the inner edges 33 is approximately 0.035 inches. For wall panels of greater thickness, proportionate changes would be made in the dimension of the strip 11.

During use of the grommet strip 11, an exposed edge of a wall panel 51 (shown by dashed lines in FIG. 2) is forced into the elongated channel of a grommet strip 11. A length of the grommet strip 11 is cut to accommodate the length of a panel edge to be covered. When completely mounted, an outer edge 52 of the panel 51 engages an inner surface 53 of the base portion 14 and the inner edges 33 of the finger portions 55 engage marginal portions of the panel 51 to securely retain the grommet strip 11 in position. During mounting, the grommet strip 11 can be bent along arcs either parallel or transverse to the longitudinal axis thereof to accommodate panel edges of various shape including rectangular.

Figure 5:
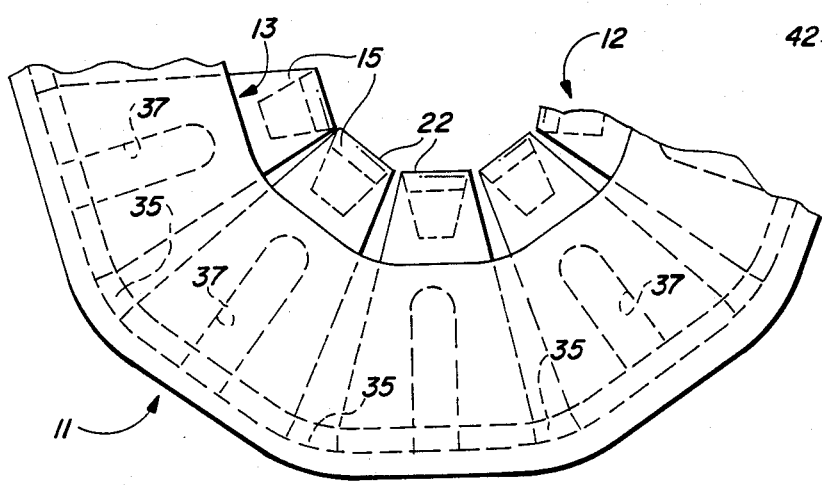
FIG. 5 is a schematic view of the grommet strip in a curved position.

The structural relief provided by the notches 35 improves the capability of the grommet strip 11 to flex in ares of either sense parallel to the longitudinal axis thereof. Conversely, the transverse slots 37 in the substrate strip 12 facilitate bending of the grommet strip 11 in arcs transverse to the longitudinal axis thereof. An additional advantage of the grommet strip 11 is provided by inwardly sloping side edges 23 of the finger portions 15. The relatively large bases provided by the bottom edges 21 enhance the spring force available at the inner edges 33 for gripping the panel 51 while the sloping side edges 23 of the finger portions 15 facilitate bending of the grommet strip 11 along arcs as shown in FIG. 5.

Referring now to FIGS. 6–9 there is shown another grommet embodiment of the invention again including a spring tempered metal substrate strip 50. After being stamped and prior to being formed into a grommet as shown in FIGS. 8 and 9, the substrate strip 50 has the appearance shown in FIGS. 6 and 7. An elongated base portion 51 has parallel, longitudinally extending edges 52 and 53. Projecting from the longitudinal edge 52 are a plurality of finger portions 54, longitudinally spaced apart by a uniform distance d. Similarly projecting from the longitudinal edge 53 are a plurality of finger portions 55 also longitudinally spaced apart by a uniform distance d. Each of the finger portions 54, 55 has a bottom edge 56 joined to the base portion 51 and having a length d' slightly less than the distance d. Opposite to the bottom edges 56 are top edges 59 joined thereto by sloping side edges 57 and 58. Centrally formed in each of the finger portions 54, 55 is a tab 61 having a free end 62 bent away from the surface of the finger portion to provide thereabove a tab edge 63. As shown in FIG. 6, the finger portions 54 are longitudinally spaced from the finger portions 55 such that each of the finger portions 54 is transversely aligned with a longitudinal space between a pair of finger portions 55 and each of the finger portions 55 is transversely aligned with a longitudinal space. between a pair of finger portions 54.

After being stamped in the form shown in FIGS. 6 and 7, the substrate strip 50 is used to form a grommet 71 shown in FIGS. 8 and 9. During forming operations, all of the finger portions 54, 55 are bent into positions that extend substantially orthogonally in the same direction from the base portion 51 so as to form therewith a channel 72. Formed between each pair of the finger portions 54, 55 is a strip void that communicates with the channel 72. The finger portions 54, 55 are bent in a direction suc that the tab edges 63 project into the channel 72 as shown in FIG. 9. In addition, a first intermediate portion 73 of each finger portion 54, 55 between he bottom edge 56 and the top edge 59 thereof is bent into the channel 72 while a second intermediate portion 74 is bent away from the channel 72. Thus, each of the fnger portions 54, 55 is formed with a V-shaped section and the tab edges 63 are the most closely spaced apart surfaces on the transversely spaced apart finger portions 54, 55. The tab edges 63 function, therefore, as gripping edges when the grommet 71 is positioned over the exposed edge of a wall 76 as shown in FIG. 9.

After being formed, the substrate strip 50 is coated with a suitable resilient, non-metalic coating 75 such as Nylon for other appropriate thermosetting or thermoplastic polymer. The coating 75 is applied to the outer surface of the base portion 51 and to the outer surfaces and top and side edges of the finger portions 54, 55. Preferably, the coating 75 is applied as an electrostatic spray and then fused to the substrate strip 50 by exposure to heat in an oven. As shown in FIGS. 8 and 9 the bounds of the coating 74 are limited so as to establish coating voids coextensive with the strip voids between the finger portions 54, 55 and therewith forming transverse openings into the channel 72.

The grommet embodiment 71 is used in the same manner as the grommet shown in FIGS. 1-5 but exhibits a number of unique advantages. Because of the longitudinally alternating positions of the finger portions 54, 55, the grommet 71 can assume extremely small radii of curvature when applied in the manner shown in FIG. 5. The small radii of curvature are possible because of the substantial spacing d between each pair of both the finger portions 54 and the finger portions 55. That spacing also permits the fabrication of the substrate 50 in a progressive die since a transversely moving slide can be used to form the V-shaped finger portions 54, 55. Also advantageous is coating the edges of the finger portions 54, 55 so as to eliminate sharp edges thereon and thereby permit the use of a narrower steel substrate strip. An additional reduction of material is provided by the tabs 61 which eliminate the bent over portions 32 of the embodiment shown in FIGS. 1-5.

Obviously, many modifications and variations of the present invention are possible in light of the above teachings. For example, by changing the shape of the bottom wall 41 of the channel 13 to provide a hollow channel section, the grommet strip 11 can be used as a sealing gasket. Similarly, by using a conductive elastomer for the coating 13, the grommet strip 11 can be used as a grounding strip. It will be understood, also, that materials other than those specifically disclosed can be used such as carbon steel, spring tempered cold rolled steel, phosphor bronze or beryllium copper for the substrate strip 12 or a resilient elastomer for the coating 13. Also, the coating 13 can be applied to the substrate strip 12 in other ways such as by electrostatic painting or in a fluidized bed coating process. It is to be understood, therefore, that the invention can be practiced otherwise than as specifically described.

What is claimed is:

1. A grommet strip for mounting along an exposed edge of a wall and comprising:

a spring tempered metal substrate strip comprising an elongated base portion and a plurality of discrete spaced apart finger portions extending in a common direction from each longitudinal edge of said base portion and substantially normal thereto, inner surfaces of said base and finger portions forming an elongated channel with an open end opposite to said pase portion and adapted to receive the edge of the wall with said inner surface of said base portion engaging the exposed edge said inner surfaces of said finger portions engaging marginal sections of the wall directly adjacent thereto, and wherein said finger portions extending from each of said edges are substantially spaced apart so as to establish strip voids therebetween; and a resilient non-metallic coating covering outer surface portions of said base portion so as to provide an elongated resilient surface along the exposed edge, the bounds of said coating being limited so as to provide coating voids coextensive with said strip voids and therewith forming into said elongated channel transverse openings that enhance the longitudinal flexibility of said strip.

2. A grommet strip according to claim 1 wherein said substrate strip is a stamping and said finger portions extending from one of said edges are longitudinally displaced with respect to said finger portions extending from the other of said edges so as to be transversely non aligned therewith.

3. A grommet strip according to claim 2 wherein each of said finger portions comprises a bottom edge fixed to one of said longitudinal edges, a top edge substantially shorter than said bottom edge, and side edges that slope toward each other between said bottom and top edges.

4. A grommet strip according to claim 3 wherein said finger portions extending from each of said edges are separated by spaces of substantial length and have bottom longitudinally extending edges of substanial length joined to one of said edges of said base portion.

5. A grommet strip according to claim 4 wherein each of said finger portions extending from each said edge is transversely aligned with a said space between a pair of said finger portions extending from the other said edge.

6. A grommet strip according to claim 5 wherein each of said bottom edges has a length slightly less than said substantial given length.

7. A grommet strip according to claim 6 wherein said coating covers the outer surface of said base portion and the outer surfaces and top and side edges of said finger portions while leaving the inner surfaces of said finger portions exposed.

8. A grommet strip according to claim 7 wherein each of said finger portions comprise a first intermediate portion joined to said longitudinal edge and a second intermediate portion extending from said first intermediate portion, and said first intermediate portion is bent into said channel and said second intermediate portion is bent away from said cannel so as to provide said finger portion with a V-shaped section, 9. A grommet strip according to claim 8 wherein each of said finger portions defines an engagement edge projecting into said channel and said engagement edges are shaped and arranged to engage said marginal portions of the wall.

10. A grommet strip according to claim 9 wherein said engagement edges are defined by tabs formed on said finger portions and having free ends bent into said channel.

11. A grommet strip according to claim 1 wherein each of said finger portions comprises a bottom edge fixed to one of said longitudinal edges, a top edge substantially shorter than said bottom edge, and side edges that slope toward each other between said bottom and top edges.

12. A grommet strip according to claim 1 wherein said coating covers the outer surface of said base portion and the outer surfaces and top and side edges of said finger portions while leaving the inner surfaces of said finger portions exposed.

13. A grommet strip according to claim 1 wherein each of said finger portions comprise a first intermediate portion joined to said longitudinal edge and a second intermediate portion extending from said first intermediate portion and said first intermediate portion is bent into said channel and said second intermediate portion is bent away from said channel so as to provide said finger portion with a V-shaped section.

14. A grommet strip according to claim 13 wherein each of said finger portions defines an engagement edge projecting into said channel, and said engagement edges are shaped and arranged to engage said marginal sections of the wall.

15. A grommet strip according to claim 14 wherein said engagement edges are defined by tabs formed on said finger portions and having free ends bent into said channel.

* * * * *